H. R. HUGHES.
ROLLER BORING DRILL.
APPLICATION FILED JUNE 20, 1913.
1,119,164.
Patented Dec. 1, 1914.
2 SHEETS—SHEET 1.
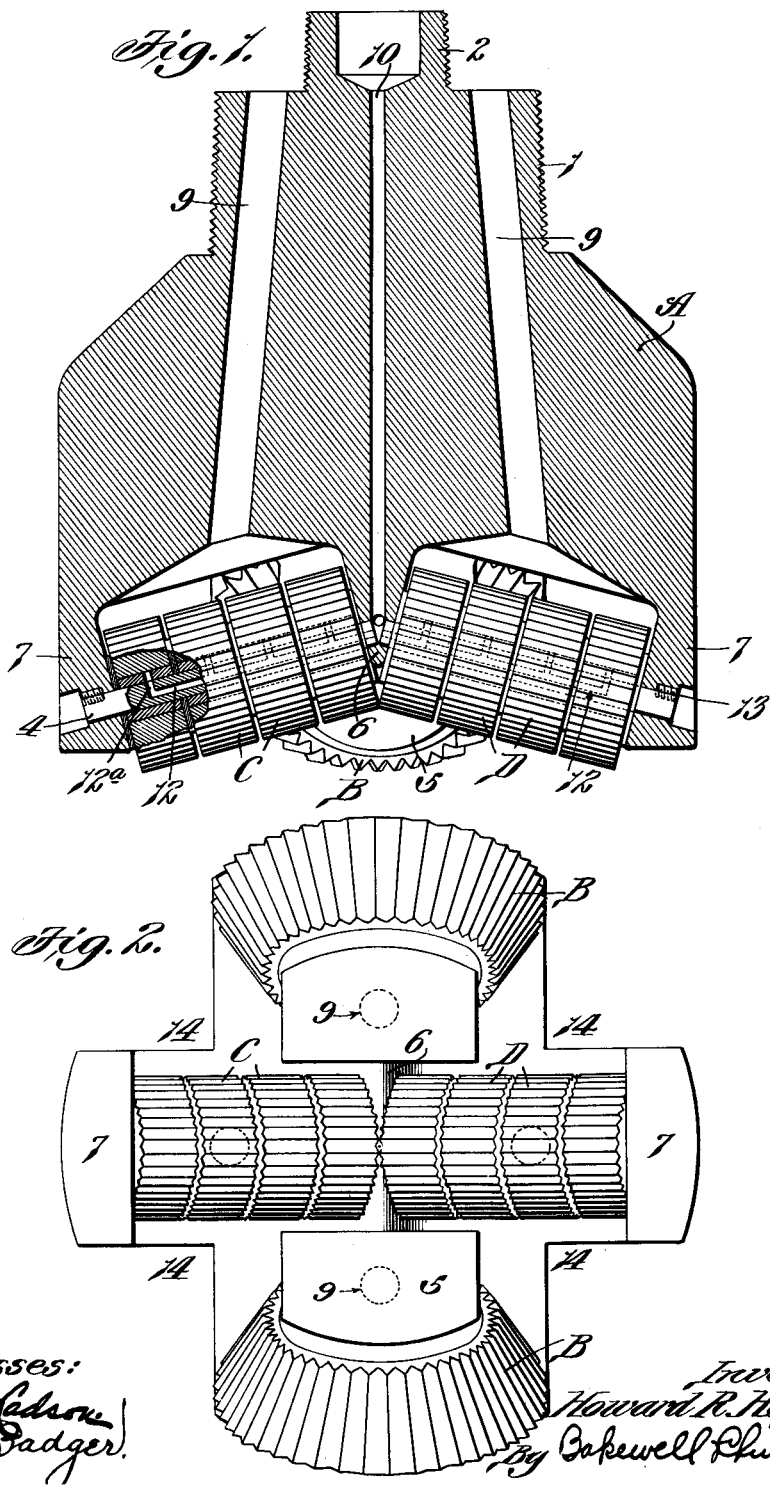
Witnesses:
Geo. P. Ledson
C. M. Badger
Inventor:
Howard R. Hughes.
By Bakewell & Shine attys.

H. R. HUGHES.
ROLLER BORING DRILL.
APPLICATION FILED JUNE 20, 1913.
1,119,164.
Patented Dec. 1, 1914.
2 SHEETS—SHEET 2.
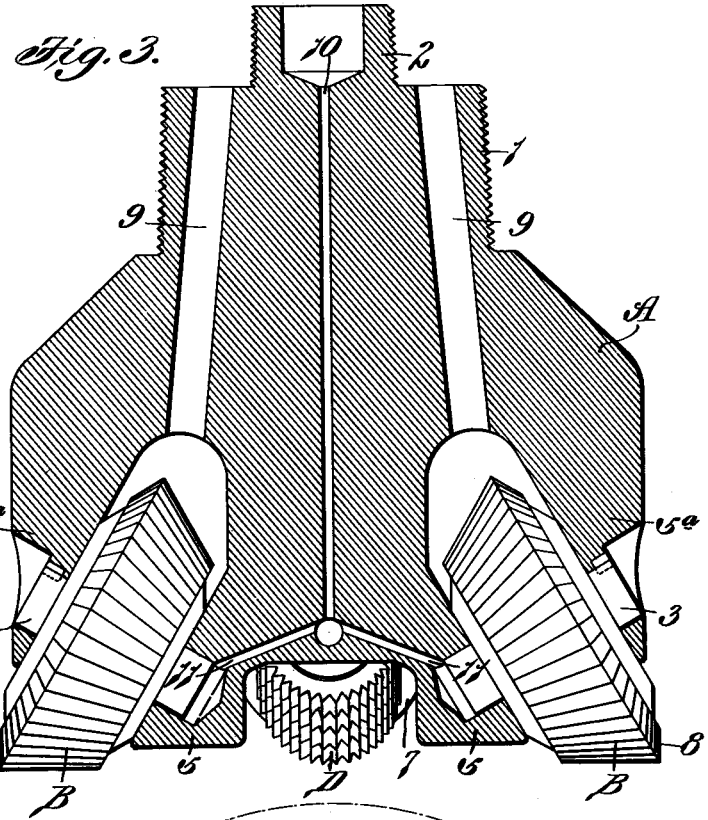
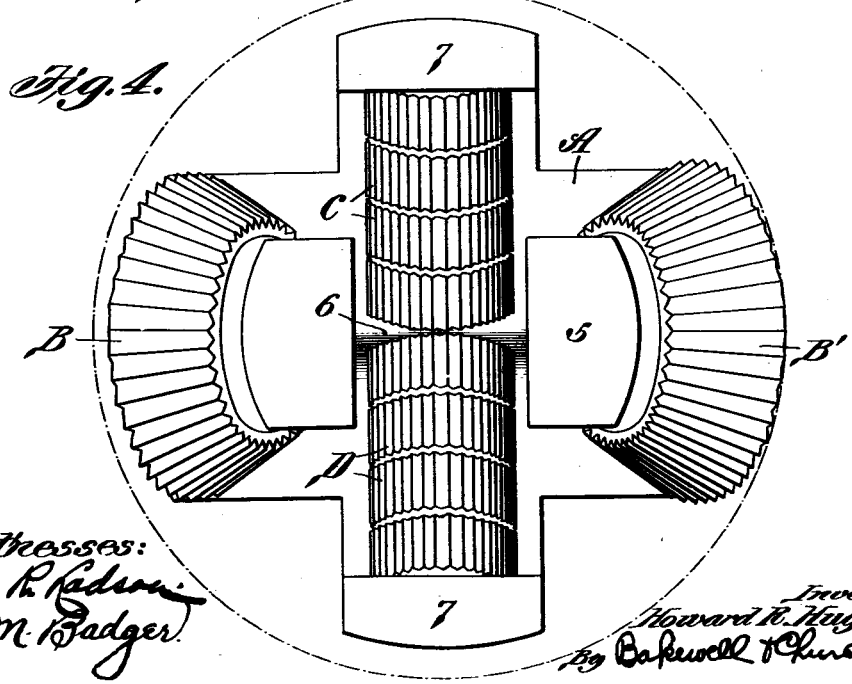

UNITED STATES PATENT OFFICE.

HOWARD R. HUGHES, OF HOUSTON, TEXAS.

ROLLER BORING-DRILL.

1,119,164.   Specification of Letters Patent.   Patented Dec. 1, 1914.

Application filed June 20, 1913. Serial No. 774,773.

*To all whom it may concern:*

Be it known that I, HOWARD R. HUGHES, a citizen of the United States, residing at Houston, Texas, have invented a certain new and useful Improvement in Roller Boring-Drills, of which the following is a full, clear, and exact description, such as will enable others skilled in the art to which it appertains to make and use the same.

This invention relates to roller boring drills.

One object of my invention is to provide a strong and rigid roller boring drill that can be manufactured at a low cost, and which is so designed that sufficient clearance is always provided around the drill head to permit the displacements and cuttings to get by the drill and thus enable the drill to reach the bottom of the hole.

Another object is to provide a roller boring drill in which the cutting rollers are so arranged that the head of the drill will remain centered in the hole and consequently will not wabble from side to side during the drilling operation. And still another object is to provide a roller boring drill in which the rollers are so arranged that the head can be provided with bearings for both ends of the spindles on which the cutting rollers are mounted.

Other objects and desirable features of my invention will be hereinafter pointed out.

Figure 1 of the drawings is a vertical sectional view of a roller boring drill constructed in accordance with my invention; Fig. 2 is a bottom plan view of said drill; Fig. 3 is a vertical sectional view taken at approximately right angles to Fig. 1; and Fig. 4 is a bottom plan view illustrating a slight modification of my invention.

Referring to Figs. 1 to 3 of the drawings which illustrate the preferred form of my invention, A designates the head of the drill which is preferably formed in one piece and provided at its upper end with a screw-threaded boss 1 to which the hollow drill stem or operating member, not shown, is connected. A ring-shaped flange 2 is also provided at the upper end of the head so as to support a lubricant-holder, not shown. Two approximately frusto-conical-shaped cutting rollers B are arranged diametrically opposite each other on spindles 3 that incline downwardly and inwardly toward the longitudinal axis of the head A, and two groups of cutting rollers C and D are arranged intermediate the rollers B on spindles 4 that are arranged at right angles to the spindles 3 and extend transversely across the head A of the drill, the spindles 4 being inclined in an opposite direction to the spindles 3, or, in other words, being inclined downwardly and outwardly from the longitudinal axis of the drill head. The inner ends of the spindles 3 are supported by center bearings 5 on the drill head that lie between the inner ends of the rollers B and the inner rollers of the groups of small rollers C and D, and the outer ends of the spindles 3 are supported by side bearings 5ª on the head, as shown in Fig. 3. A center bearing 6 on the head, which extends transversely between the bearings 5 and is preferably formed integral with said bearings 5, supports the inner ends of the spindles 4, and the outer ends of said spindles 4 are supported by integral side bearings 7 on the head A, as shown in Fig. 1. By forming the drill in this manner I obtain a very strong and rigid construction in view of the fact that the spindles for the cutting rollers of the drill are supported at both ends by integral bearings on the head of the drill, and the bearings 5 for the inner ends of the spindles 3 are tied together by an integral portion 6 of the drill head that supports the inner ends of the spindles 4. The approximately frusto-conical-shaped rollers B are provided at their outer ends with cutting teeth 8 that shear off the material at the sides of the hole and thus form sufficient clearance for the head of the drill to prevent it from sticking in the hole, and, if desired, one of said rollers can be larger than the other so as to allow for wear on the teeth 8 and thus insure sufficient clearance for the head of the drill after the rollers B have become worn. In Fig. 4 I have illustrated a drill in which the roller B' at one side of the head is of greater diameter than the roller B at the opposite side of the head so that it will project farther laterally from the head and thus describe a circular path of greater diameter than that described by the roller B, as indicated in broken lines in Fig. 4. By forming the drill in this manner, namely, equipping it with a roller that projects laterally farther from one side of the center axis of the drill head than the other cutting rollers, sufficient clearance for the drill is insured to reduce the liability of the drill sticking in the hole to a minimum.

The rollers C and D are comparatively small rollers and are substantially disk-shaped or, in other words, have cutting surfaces that extend parallel to the axis about which said rollers rotate. By arranging the rollers C and D on spindles that incline downwardly and outwardly from a center bearing on the head I obtain a drill in which the cutting rollers are so disposed that there is little tendency for the drill head to wabble owing to the fact that the rollers C and D form a hole whose bottom is substantially pyramidal-shape at the center. The head A is provided with the usual water-holes 9 so as to cause jets of water to be projected downwardly onto the material displaced by the cutting rollers, and a lubricating duct 10 is formed in the head, as shown in Figs. 1 and 3, for supplying a lubricating medium to ducts 11 that lead to the bearing surfaces on which the rollers B rotate and also to ducts 12 in the spindles 4 which are provided with branches 12ª that lead to the surfaces on which the rollers C and D rotate. The spindles 3 and 4 can be secured to the head in various ways, the means herein shown consisting of set-screws 13 that are screwed into coöperating recesses in the spindles and in the bearings that support the outer ends of the spindles. Vertically disposed notches 14 are formed in the head at points between the bearings 5ª and the bearings 7, as shown in Fig. 2, so as to permit the displacements and cuttings to get by the drill head and thus enable the drill to reach the bottom of the hole, the head of the drill being substantially cruciform-shape in cross section.

A drill of the construction above-described can be manufactured at a low cost; it is exceptionally strong and rigid owing to the fact that the spindles for all of the cutting rollers are supported at both ends in bearings on the head; and the center bearings which support the inner ends of said spindles are integrally connected to each other and to the head. The head is so designed that ample clearance around the head is provided for the material that is displaced and disintegrated by the cutting rollers, thus eliminating the possibility of the disintegrated material packing in the hole; and still another desirable feature of such a drill is that it will remain centered in the hole and will not wabble from side to side during the drilling operation.

Having thus described my invention, what I claim as new and desire to secure by Letters Patent is:

1. A roller boring drill comprising a head provided with inclined side cutting rollers, cutting rollers arranged transversely of the head intermediate said side cutting rollers, spindles for said intermediate rollers that incline downwardly in opposite directions from the longitudinal axis of the head, and bearings on the head for supporting both ends of said spindles.

2. A roller bearing drill comprising a head provided with a center bearing and with side bearings oppositely inclined, spindles supported in said bearings and provided with cutting rollers, and a side cutting roller on said head whose axis of rotation is disposed at approximately right angles to said spindles and inclined downwardly from the outer side toward the center of the head.

3. A roller boring drill comprising a head provided with side bearings and with a center bearing that is located at the longitudinal center of the head, spindles supported at their opposite ends by said bearings and extending transversely of the head, the outer ends of said spindles being inclined downwardly, cutting rollers on said spindles which form a circular hole in which no center core is left standing, and an independent cutting roller on said head arranged to travel in the circular path described by the side bearings of the head when the head is rotated.

4. A roller boring drill comprising a head provided with a center bearing and with side bearings transversely disposed, spindles supported by said bearings and having their outer ends inclined downwardly, cutting rollers on said spindles that disintegrate the material at the center of the hole, and an approximately frusto-conical-shaped cutting roller on the head whose axis is inclined inwardly and downwardly toward the longitudinal center of the head and whose function is to cut a circular path through which said side bearings travel.

5. A roller boring drill comprising a head, a pair of approximately frusto-conical-shaped cutting rollers arranged diametrically opposite each other on spindles that incline inwardly and downwardly toward the longitudinal axis of the head, and independent cutting rollers arranged intermediate said approximately frusto-conical-shaped rollers on spindles that are inclined downwardly and outwardly from the center of the head.

6. A roller boring drill comprising a head, a pair of approximately frusto-conical-shaped cutting rollers arranged diametrically opposite each other on spindles that incline inwardly and downwardly toward the longitudinal axis of the head, independent cutting rollers arranged intermediate said approximately frusto-conical-shaped rollers at right angles thereto on spindles whose outer ends are inclined downwardly, and bearings on the head for supporting both ends of all of said spindles.

7. A roller boring drill comprising a head provided with a group of oppositely inclined rollers that extend transversely of the head and which are so arranged that they will form an approximately pyramidal-shaped surface at the bottom of the hole, and a pair of approximately frusto-conical-shaped rollers arranged diametrically opposite each other on opposite sides of said group of rollers on spindles that incline downwardly and inwardly toward the longitudinal center of the head.

8. A roller boring drill comprising a head, approximately frusto-conical-shaped cutting rollers arranged on inclined spindles whose opposite ends are supported in the head, and a pair of oppositely inclined spindles arranged transversely of the head between said frusto-conical-shaped rollers and provided with cutting rollers that remove the material at the center of the hole.

9. A roller boring drill comprising a head provided with a pair of center bearings that are spaced apart and side bearings that coöperate with said center bearings oppositely inclined, spindles supported at their opposite ends by said bearings and provided with approximately frusto-conical-shaped cutting rollers, and two groups of oppositely inclined cutting rollers arranged transversely of the head intermediate said approximately frusto-conical-shaped rollers and extending at approximately right angles to same.

10. A roller boring drill comprising a head provided with a pair of spaced center bearings and with side bearings that coöperate with said center bearings, inclined spindles supported by said bearings and provided with tapered cutting rollers that are arranged diametrically opposite each other, a spindle-supporting means formed integral with said center bearings and acting to tie same together, and oppositely inclined spindles supported at their inner ends by said spindle-supporting means and provided with cutting rollers.

11. A roller boring drill comprising a head provided with a central spindle-supporting means, four spindles supported at their inner ends by said means and projecting radially therefrom, bearings on the head for supporting the outer ends of said spindles, and cutting rollers on said spindles, said spindles being arranged in pairs with the coöperating spindles of each pair inclined in opposite directions.

12. A roller boring drill comprising a head provided with a central spindle-supporting means, a pair of approximately frusto-conical-shaped cutting rollers mounted on short spindles that incline downwardly and inwardly toward the longitudinal axis of the head, the inner ends of said spindles being supported by said means, and a separate and distinct pair of oppositely inclined spindles supported by said means and provided with cutting rollers that disintegrate the material at the center of the hole.

13. A roller boring drill comprising a head of approximately cruciform-shape in cross section provided with a central spindle-supporting means, pairs of oppositely inclined spindles arranged at right angles to each other and branching radially from said central supporting means, bearings on the head for the outer ends of said spindles, and cutting rollers mounted on said spindles.

In testimony whereof I hereunto affix my signature in the presence of two witnesses, this eleventh day of June, 1913.

HOWARD R. HUGHES.

Witnesses:
 HYMAN LEVIN,
 EARL LEIB.